Sept. 14, 1948.  P. M. VAN ALPHEN  2,449,259
SCHMIDT TYPE OPTICAL SYSTEM WITH PARALLEL
PLATE REFRACTIVE ELEMENT
Filed April 18, 1946
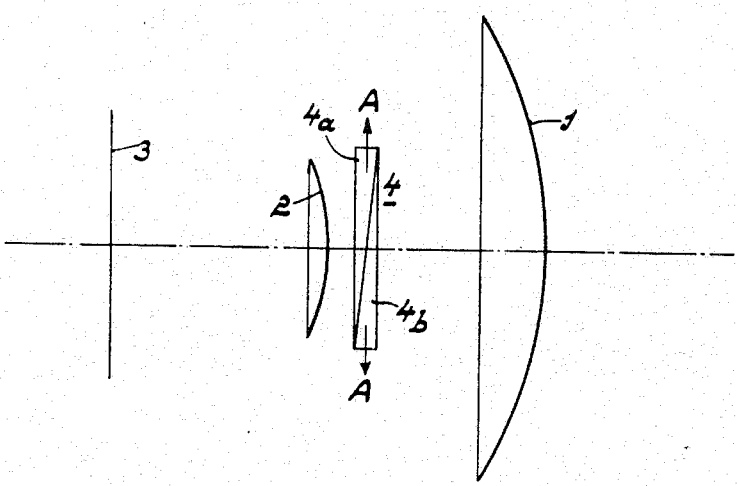
INVENTOR
PIETER MARTINUS VAN ALPHEN
BY Lee B. Kenow
ATTORNEY Patented Sept. 14, 1948

2,449,259

UNITED STATES PATENT OFFICE 2,449,259

SCHMIDT TYPE OPTICAL SYSTEM WITH PARALLEL PLATE REFRACTIVE ELEMENT

Pieter Martinus van Alphen, Eindhoven, Netherlands, assignor, by mesne assignments, to Hartford National Bank and Trust Company, Hartford, Conn., as trustee Application April 18, 1946, Serial No. 663,143
In the Netherlands July 1, 1941

Section 1, Public Law 690, August 8, 1946
Patent expires July 1, 1961

3 Claims. (Cl. 88—57)

As is well-known the optical system according to Schmidt, which is also called Schmidt-camera and described in "Lunettes et Télescopes," by Danjon et Coudert 1935, pages 252 to 254, has the advantage that by comparatively simple auxiliary means a system is obtained having a large aperture ratio. The chief elements forming part of such a system are the receiving mirror, the projection surface and the correcting element which mainly serves to correct the spherical aberration of the spherical collecting mirror and which by itself does not practically contribute to the optical strength of the system. The shape of this correcting element depends on the distance of the object to be recorded by means of this camera from the latter. Hence, it will be obvious that in order to obtain the optimum result at different distances of the object by means of the camera, one should actually dispose of a certain number of correcting elements with limiting surfaces having a different shape with respect to one another. The latter entails difficulties since the correcting elements are comparatively expensive on account of their aspherical limiting surfaces. The optical system according to the invention meets this drawback. In the optical system of the invention according to Schmidt a transparent, if desired replaceable, plate, for instance a glass plate, having parallel limiting planes is placed between the projection surface and the collecting mirror. Owing to its thickness this plate has a correcting effect on the action of the correcting element already available. In this case the following considerations hold. At the distance of the object, for which the correcting element is proportioned, the spherical collecting mirror has a spherical aberration which is equal to zero. If the same system is now used for another distance of the object a slight spherical longitudinal aberration occurs which in regard to the outer parts of the spherical mirror increases with the square of the distance of the mirror portion in question from the axis of the system. Furthermore, when the distance of the object is made larger with a Schmidt system the occurring spherical aberration is equal in sign to the spherical aberration of the spherical mirror forming part of the system and consequently opposite in sign to the spherical aberration of a transparent plate having relative parallel limiting planes. Since, moreover, in regard to the aperture angles of a Schmidt camera occurring in practice the spherical aberration of such a transparent plate can be represented with sufficient exactitude by a quadratic function, it will be obvious that by a suitable choice of the thicknesses of a number of transparent plates for any object distance occurring in practice a Schmidt camera can be built which, by means of one and the same correcting element meets all of these object distances. The said plate may either exhibit two flat limiting planes or two curved limiting planes, whose centers of curvature coincide and are located on the side of the correcting element. When choosing a curved correcting element in the sense of the invention the two limiting planes are preferably given a spherical shape, since the manufacture of such a plate is comparatively easy. From this it results that transparent plates having different thicknesses will have a different correcting effect on the correcting element proper. According to the invention this can be ensured in a comparatively simple manner by providing, in a suitable form of construction of the invention, that the transparent plate consists of two halves having a wedge-shaped cross-section, which halves are movable relatively to one another in such manner that the optical thickness of the transparent plate can be altered thereby. After the thickness of the transparent plate has been accommodated to the new object distance the camera will generally have to be focused.

According to the invention it is advisable that the transparent plate should be placed in the vicinity of a projection surface and be given cross dimensions of the order of magnitude of the size of the projection surface. In this way light rays passing from the correcting element to the receiving mirror are prevented from being intercepted by this plate.

The invention will be more fully explained by reference to the accompanying drawing schematically representing the optical system according to Schmidt. This system comprises the receiving mirror 1, the projection surface 2 and the correcting element 3 which for the sake of simplicity is indicated by a straight line but actually exhibits as a rule at least one aspherical limiting surface. The transparent glass plate which, as regards the object-distance of the camera, has a correcting effect on the correcting element 3, is designated by 4. This plate consists of two halves 4a and 4b which exhibit a wedge-shaped cross-section and whose limiting planes, which are inclined with respect to the axis X—X of the system face each other. These limiting planes preferably engage each other but they may also be slightly spaced apart. When shifting the halves 4a and 4b in the direction of the arrow A the glass-thickness of the plate becomes smaller which has a different effect on the light rays passing from the receiving mirror 1 to the projection surface 2, as a result of which the camera particularly suits an object distance different from the initial object distance, since the glass-thickness of the plate 4 is reduced thereby. When shifting the halves 4a and 4b relatively to one another in opposite directions the glass-thickness becomes larger. Of course, this can also be ensured if only one of the plate halves is movable. If desired, in order to accommodate the camera particularly to different object-distances, different glass plates having relative different thicknesses might be provided in a holder which plates may be successively placed in front of the projection surface. It appears from the drawing that the cross dimensions of the plate 4 are about of the order of magnitude of the cross-dimensions of the projection surface 2 so that substantially only those light rays, which pass from the receiving mirror 1 to the projection surface 2, are received by the plate 4.

The correcting element may be designed in such manner that, if there is no transparent plate at all in the passage of the rays between the receiving mirror 1 and the projection surface 2, it suits a definite distance of the object. As an alternative it may be so designed as to be adapted steadily to cooperate with a transparent glass-plate which may be done, for instance, in the construction according to the drawing, since it might structurally be objectionable to remove the plate 4 from the camera.

What I claim is:

1. A Schmidt type optical system comprising a concave spherical mirror, a correction element calculated to correct by refraction for the spherical aberration of said mirror and to provide a finite throw distance for said system, and means to vary the throw distance of said spherical mirror and correction element comprising a refractive optical element having substantially parallel plane refractive surfaces interposed between said mirror and the short conjugate focal surface of said system.

2. A Schmidt optical system comprising a concave spherical mirror, a correction element calculated to correct by refraction for the spherical aberration of said mirror and to provide a finite throw distance for said system, and means to vary the throw distance of said spherical mirror and correction element comprising a refractive optical element having substantially plane parallel refractive surfaces and having two wedge-shaped refractive plates interposed between said mirror and the short conjugate focal surface of said system and arranged to be adjustable perpendicular of the axis of said system to adjust the thickness of said refractive optical element.

3. A Schmidt type optical system comprising a concave spherical mirror, a correction element calculated to correct by refraction for the spherical aberration of said mirror and to provide a finite throw distance for said system, and means to vary the throw distance of said spherical mirror and correction element comprising a refractive optical element having substantially plane parallel refractive surfaces interposed between said mirror and the short conjugate focal surface of said system and having dimensions radially of the optical axis of the said system substantially equal to the said focal surface.

PIETER MARTINUS van ALPHEN.

REFERENCES CITED

The following references are of record in the file of this patent:

UNITED STATES PATENTS

| Number | Name | Date |
|---|---|---|
| 2,031,792 | Richter | Feb. 25, 1936 |
| 2,170,979 | Straubel | Aug. 29, 1939 |
| 2,258,903 | Mitchell | Oct. 14, 1941 |
| 2,298,808 | Ramberg | Oct. 13, 1942 |
| 2,305,855 | Epstein et al. | Dec. 22, 1942 |
| 2,309,788 | Ramberg | Feb. 2, 1943 |

FOREIGN PATENTS

| Number | Country | Date |
|---|---|---|
| 544,694 | Great Britain | Apr. 23, 1942 |